United States Patent
Morel et al.

(10) Patent No.: US 9,045,350 B2
(45) Date of Patent: Jun. 2, 2015

(54) METHOD FOR CONVERTING $UO_3$ OR $U_3O_8$ INTO HYDRATED $UO_4$

(75) Inventors: Bertrand Morel, Saint Paul Trois Chateaux (FR); David Amaraggi, Le Village Marsanne (FR); Mehdi Arab, Bagnols sur Ceze (FR); Rudy Thomas, Tatinghem (FR); Murielle Rivenet, Baisieux (FR); Francis Abraham, Genech (FR)

(73) Assignee: COMURHEX SOCIETE POUR LA CONVERSION DE L'URANIUM EN METAL ET HEXAFLUORURE, Pierrelatte (FR)

( * ) Notice: Subject to any disclaimer, the term of this patent is extended or adjusted under 35 U.S.C. 154(b) by 0 days.

(21) Appl. No.: 13/995,277

(22) PCT Filed: Dec. 16, 2011

(86) PCT No.: PCT/EP2011/073132
§ 371 (c)(1),
(2), (4) Date: Jul. 8, 2013

(87) PCT Pub. No.: WO2012/084740
PCT Pub. Date: Jun. 28, 2012

(65) Prior Publication Data
US 2013/0280157 A1 Oct. 24, 2013

(30) Foreign Application Priority Data
Dec. 24, 2010 (FR) ...................................... 10 61249

(51) Int. Cl.
*C01G 43/01* (2006.01)
*C01B 15/047* (2006.01)
*C01G 43/06* (2006.01)

(52) U.S. Cl.
CPC ............ *C01G 43/01* (2013.01); *C01B 15/0475* (2013.01); *C01G 43/06* (2013.01); *C01P 2002/72* (2013.01); *C01P 2004/03* (2013.01); *C01P 2004/10* (2013.01); *C01P 2004/54* (2013.01); *C01P 2006/12* (2013.01)

(58) Field of Classification Search
None
See application file for complete search history.

(56) References Cited

U.S. PATENT DOCUMENTS 2,723,181 A * 11/1955 Larson .......................... 423/260
4,247,522 A    1/1981 Pyman et al.
2013/0061661 A1  3/2013 Morel et al.

FOREIGN PATENT DOCUMENTS

| EP | 0054014 A1 | 6/1982 |
| FR | 2429747 A1 | 1/1980 |
| FR | 2438623 A1 | 5/1980 |
| WO | 2009013759 A1 | 1/2009 |
| WO | 2010051855 A1 | 5/2010 |

* cited by examiner

*Primary Examiner* — Steven Bos
(74) *Attorney, Agent, or Firm* — Hultquist, PLLC; Mary B. Grant

(57) ABSTRACT

A method for converting $UO_3$ and/or $U_3O_8$ into hydrated $UO_4$ of formula $UO_4 \cdot nH_2O$ wherein n is 2 or 4, comprising the following successive steps:
a) preparing an aqueous suspension of a $UO_3$ powder and/or a $U_3O_8$ powder;
b) adding hydrogen peroxide $H_2O_2$ to the aqueous suspension of a $UO_3$ and/or $U_3O_8$ powder, converting the $UO_3$ and/or $U_3O_8$ into hydrated $UO_4$ and precipitating, crystallizing the hydrated $UO_4$ in the suspension;
c) recovering the precipitate, crystals of $UO_4$ hydrate;
d) optionally, washing the recovered $UO_4$ hydrate precipitate, crystal(s);
e) optionally, repeating step d);
f) optionally, drying the precipitate, the crystals;
wherein the addition of $H_2O_2$ to the aqueous suspension is carried out so that the suspension contains a stoichiometric excess of $H_2O_2$ relatively to the stoichiometry of the reaction from $UO_3$:

$$UO_3 + nH_2O + H_2O_2 \rightarrow UO_4 \cdot nH_2O + H_2O \qquad (1)$$

or of the reaction from $U_3O_8$ $$UO_{2.67} + 1.33H_2O_2 + nH_2O \rightarrow UO_4 \cdot nH_2O + 1.33H_2O \qquad (2),$$

and the pH of the suspension is maintained in steps a) and b) at a value comprised between 2 and 3.

21 Claims, 6 Drawing Sheets

METHOD FOR CONVERTING $UO_3$ OR $U_3O_8$ INTO HYDRATED $UO_4$

CROSS-REFERENCE TO RELATED APPLICATIONS

This application is a U.S. national phase under the provisions of 35 U.S.C. §371 of International Patent Application No. PCT/EP11/073132 filed Dec. 16, 2011, which in turn claims priority of French Patent Application No. 1061249 filed Dec. 24, 2010. The disclosures of such international patent application and French priority patent application are hereby incorporated herein by reference in their respective entireties, for all purposes.

TECHNICAL FIELD

The invention relates to a method for converting $UO_3$ or $U_3O_8$ into hydrated $UO_4$ ($UO_4$ hydrate).

STATE OF THE PRIOR ART

The treatment of uranium ores has the purpose of extracting uranium from the ores, of purifying it and of combining it so as to obtain a product called a concentrate, or uranate or further a « yellow cake » rich in uranium, for example comprising more than 70% by weight of uranium.

Uranium ores are first of all crushed, and then milled, and they are then subject to an operation for putting the uranium into solution by means of a base or an acid, such as for example sodium carbonate or sulfuric acid, called etching or leaching.

After purification and concentration of the solutions from the leaching of the ore, the uranium is recovered in the form of uraniferous, uraniated, generally acid, liquors, solutions, in a sulfates medium for example.

These solutions may also be in a chloride, ammonia, nitrate or carbonate medium according to the preliminary purification-concentration step.

The uranium concentrate or « yellow cake » is obtained from these uraniferous liquors, solutions, by precipitation with precipitation reagents such as soda, magnesia, ammonia, ammonium uranyl tricarbonate, and hydrogen peroxide $H_2O_2$, by filtration and drying.

According to the precipitation reagent used, the uranium concentrate or « yellow cake » will thus be respectively based on sodium uranate, magnesium uranate, ammonium diuranate, ammonium uranyl tricarbonate, or uranium peroxide.

The thereby prepared uranium concentrate or « yellow cake » is then transformed, notably into $UF_4$ and then into $UF_6$.

Uraniferous concentrates such as « yellow cake », the preparation of which was described above, but also of other uraniferous concentrates containing uraniferous uranium trioxide or uranium octa-oxide are not able to be directly converted notably into $UF_6$.

Indeed, they contain too many impurities for the subsequent isotopic separation step (also designated as enrichment) relative to the ASTM enrichment standards on the one hand, the presence of certain compounds may be prohibitive for the fluorination method on the other hand.

Moreover, certain oxides have insufficient reactivity for the reduction/hydrofluorination step leading to $UF_4$.

In order to find a remedy to all these problems, the concentrates are purified before converting them.

A purification method is thus known in which the « yellow cake » is, first of all, dissolved in nitric acid and the solution is then sent into a counter current liquid-liquid extraction apparatus in which the uranyl nitrate of the solution is extracted by using a mixture of TBP and of kerosine.

This method is complex and uses nitrates and volatile organic compounds which have to be handled.

A treatment of the used solvent and of the nitrate effluents has notably to be carried out.

The method for precipitating uranium with $H_2O_2$ is known to be decontaminating towards many impurities.

However, all the known methods for precipitating uranium with $H_2O_2$ apply preliminary dissolution of the uranium, before reprecipitation of $UO_4.4H_2O$ by addition of oxygenated water.

However, this technique has the two following major drawbacks:
- the addition of an acid and therefore of the associated anions such as sulfates, chlorides, nitrates, etc. during the dissolution step. These anions are impurities which prove to be bothersome in the subsequent conversion steps,
- the addition of a base and therefore of the associated cations such as sodium, potassium, ammonium, cations during precipitation of hydrated $UO_4$ in order to maintain the pH constant. These cations are impurities also very bothersome for the formation of $UF_4$ (Na, K . . . ), or else generate gaseous effluents.

Certain added impurities may partly follow the uranium, in spite of repeated washings, and are bothersome for the $UF_4$ conversion method.

In particular, sodium and potassium form eutectics while the sulfates release corrosive $H_2S$.

Among the documents which describe precipitation from concentrates with $H_2O_2$, for purposes of purification, mention may be made of document WO-A1-2009/013759, which describes a method for refining « yellow cake » in order to prepare uranium of nuclear quality in which precipitation is achieved in a single step in order to simultaneously remove heavy metals, boron and other rare earth metals. In this method, one begins with dissolving the « yellow cake » in nitric acid with moderate stirring in order to produce a solution of uranyl nitrate, and hydrogen peroxide is added at a predefined temperature and pH in order to selectively precipitate hydrated uranium peroxide.

The method of this document includes a preliminary step for dissolving the concentrate with nitric acid with all the drawbacks of such a step as listed above.

Document FR-A-2 438 623 relates to a method for purifying hydrated uranium(VI) peroxide wherein a uranium concentrate is digested in an acid aqueous solution, notably a solution of nitric acid, in the presence of a fluoride-complexing agent so as to obtain an aqueous solution of uranium, and this aqueous solution of uranium is reacted with a peroxide in order to precipitate hydrated uranium(VI) peroxide.

Again, the method of this document includes a preliminary step for dissolving the concentrate with an acid such as nitric acid with all the drawbacks of such a step as listed above.

Document FR-A-2 429 747 relates to a method for preparing hydrated uranium(VI) peroxide from hydrated uranium tetrafluoride, in which the hydrated uranium tetrafluoride is digested in an acid solution, notably a solution of nitric acid, in the presence of an agent for precipitating fluorides, for precipitating fluoride ions and obtaining an aqueous solution of uranium, the aqueous solution of uranium is filtered and the pH is adjusted and the aqueous uranium solution is reacted with a peroxide in order to precipitate the hydrated uranium (VI) peroxide.

There again, the method of this document includes a preliminary step for dissolving the concentrate with an acid, notably with nitric acid, with all the drawbacks of such a step as listed above.

Therefore considering the foregoing, there exists a need for a method for converting $UO_3$ or $U_3O_8$ into hydrated $UO_4$ which allows preparation of an hydrated uranium peroxide which has a low impurity content, in particular a content of impurities which is sufficiently low so that this hydrated uranium peroxide may be directly converted into $UF_4$ and then into $UF_6$.

More specifically, there exists a need for such a method which allows preparation of $UO_4$ hydrate which totally or for a major part meets the ASTM C-787 standard relating to the purity of hydrated $UO_4$ for conversion into $UF_6$.

This method should also allow preparation of hydrated uranium peroxide having a high specific surface area and great reactivity with view to its conversion into $UF_4$.

There further exists a need for such a method which is simple, reliable, safe and which includes a limited number of steps.

There also exists a need for a method which uses non-toxic reagents, not causing any harm to the environment and of low cost.

The goal of the present invention is to provide a method for converting $UO_3$ or $U_3O_8$ into hydrated $UO_4$ which meets the whole of the needs and requirements, as listed above.

The goal of the present invention is also to provide such a method which does not have the drawbacks, defects, limitations and disadvantages of the methods of the prior art, such as notably illustrated by the documents mentioned above, and which solves the problems of the methods of the prior art.

SUMMARY OF THE INVENTION

This goal, and further other ones are attained according to the invention with a method for converting $UO_3$ and/or $U_3O_8$ into hydrated $UO_4$ of formula $UO_4.nH_2O$ wherein n is 2 or 4, comprising the following successive steps:

a) preparing an aqueous suspension of a $UO_3$ powder and/or of a $U_3O_8$ powder;

b) adding hydrogen peroxide $H_2O_2$ to the aqueous suspension of a $UO_3$ and/or $U_3O_8$ powder, converting the $UO_3$ and/or the $U_3O_8$ into hydrated $UO_4$ and precipitating, crystallizing $UO_4$ hydrate in the suspension;

c) recovering the hydrated $UO_4$ precipitate, crystals;

d) optionally, washing the recovered hydrated $UO_4$ precipitate, crystals;

e) optionally, repeating step d);

f) optionally drying the precipitate, the crystals;

wherein addition of $H_2O_2$ to the aqueous suspension is carried out so that the suspension contains a stoichiometric excess of $H_2O_2$ relative to the stoichiometry of the reaction from $UO_3$:

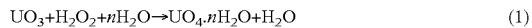

$$UO_3 + H_2O_2 + nH_2O \rightarrow UO_4.nH_2O + H_2O \quad (1)$$

or of the reaction from $U_3O_8$:

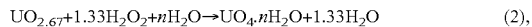

$$UO_{2.67} + 1.33H_2O_2 + nH_2O \rightarrow UO_4.nH_2O + 1.33H_2O \quad (2),$$

and the pH of the suspension is maintained in steps a) and b) at a value comprised between 2 and 3 (2 and 3 inclusive).

Advantageously, the pH of the suspension is adjusted during step a) to a value comprised between 2 and 3 by adding an acid to the suspension.

Advantageously, said acid is selected from oxalic acid, sulfuric acid and mixtures thereof.

Advantageously, the stoichiometric excess of $H_2O_2$ is from more than 1 to 10, preferably from 1.5 to 3, relatively to the stoichiometry of the reaction (1), and from more than 1.33 to 10 relatively to the stoichiometry of the reaction (2).

Advantageously, the hydrogen peroxide is added in the form of an aqueous solution at a concentration from 30% to 70% by weight.

Advantageously, the aqueous suspension of $UO_3$ and/or $U_3O_8$ has a uranium concentration from 10 to 500 g/L (gU/L), preferably from 100 to 200 g/L for $UO_3$, and from 10 to 500 g/L, preferably from 100 to 200 g/L for example 250 g/L for $U_3O_8$.

Advantageously, steps a) and b) may be carried out with stirring.

Advantageously, during step a) and/or step b), complexing anions are added to the suspension.

Advantageously, said complexing anions are selected from sulfate anions, oxalate anions and mixtures thereof.

Advantageously, the duration of step b) is selected so that the conversion of $UO_3$ and/or of $U_3O_8$ into hydrated $UO_4$ is total or substantially total, for example of more than 99%, or even 99.9%.

In an embodiment, step b) may comprise the following successive steps b1) and b2):

b1) adding hydrogen peroxide $H_2O_2$ to the aqueous suspension of a $UO_3$ and/or $U_3O_8$ powder, preferably with stirring, and then stopping the addition;

b2) ripening the suspension, preferably with stirring.

Advantageously, the duration of said step b1) may be from 1 to 8 hours, preferably from 1 to 3 hours, and the duration of step b2) may be from 1 to 24 hours, preferably from 1 to 3 hours.

In another embodiment, the addition of hydrogen peroxide $H_2O_2$ is achieved during the whole duration of step b), i.e. step b2) is omitted.

In this embodiment, the duration of step b) is generally from 1 to 8 hours, preferably from 1 to 5 hours.

Advantageously, during steps a) and/or b), the suspension is subject to the action of ultrasonic waves.

Notably in this case, the water of the suspension may be removed by evaporation, and the precipitate, the crystals of hydrated $UO_4$, are then recovered as a dry solid, for example with humidity less than 7% by mass, generally consisting of $UO_4.2H_2O$, or else during step c), the precipitate, the crystals of $UO_4$ hydrate are separated from the suspension by a solid/liquid separation operation, for example a filtration or centrifugation operation, in the form of a humid solid, for example with a humidity from 30 to 80% by mass, generally consisting of $UO_4.4H_2O$.

On the other hand, the evaporation will not generally allow removal of the impurities.

Advantageously, said humid solid is washed at least once with a washing liquid.

Advantageously, said washing liquid is selected from among demineralized water; acidified aqueous solutions preferably at a pH from 2 to 3, for example with sulfuric acid; solutions containing an agent complexing the impurities contained in the humid solid.

Advantageously, the washing ratio defined by the ratio of the mass of the washing liquid to the mass of the humid solid is from 1 to 30, preferably from 1 to 10.

Advantageously, the oxide $UO_3$ and/or the oxide $U_3O_8$ appear in the form of a uraniferous concentrate called a «yellow cake», or the oxide $UO_3$ and/or the oxide $U_3O_8$ stem from the drying, and then from the calcination of a uranium concentrate based for example on $UO_4$ hydrate, ammonium diuranate, or uranium tricarbonate obtained by precipitation in a reactor, notably in a fluidized bed reactor, from an uraniferous solution.

The method according to the invention may be defined as a method for direct conversion without preliminary dissolution of $U_3O_8$ and/or of $UO_3$ by addition of $H_2O_2$ to an aqueous suspension of a $U_3O_8$ powder and/or of a $UO_3$ powder.

The method according to the invention includes a sequence of specific steps which has never been described in the prior art.

The method according to the invention is fundamentally distinguished from the method of the prior art in that no preliminary dissolution of $U_3O_8$ and/or $UO_3$ is carried out before achieving their conversion by adding hydrogen peroxide.

The conversion of $U_3O_8$ and/or $UO_3$ into hydrated $UO_4$ ($UO_4$ hydrate) is thus, in the method according to the invention, achieved in a dispersion and not in a solution.

The method according to the invention, which does not include any preliminary step for dissolving the uranium, does not have all the drawbacks due to this preliminary dissolution step. In particular, the method according to the invention thus avoids the formation of many impurities which may prove to be extremely bothersome in the subsequent steps for conversion of $UO_4$ hydrate, for example into $UF_4$.

All the comparable methods of the prior art include such a dissolution step, and there does not exist any indication in the prior art which would have lead the man skilled in the art to suppressing this dissolution step.

The method according to the invention is further defined by the fact that the suspension contains a stoichiometric excess of $H_2O_2$ relatively to the reactions (1) and (2), which gives the possibility of obtaining total or quasi-total conversion.

The method according to the invention is further characterized in that the pH of the suspension is maintained in steps a) and b) at a specific value comprised between 2 and 3.

The selection of this very narrow pH range gives the possibility of avoiding risks of redissolution of $UO_4$ hydrate at too acid pH's, generally less than 2, on the one hand, and of avoiding the risks of formation of compounds other than $UO_4$ hydrate at more basic pHs, generally greater than 3, as well as the precipitation of impurities following the uranium, on the other hand.

The method according to the invention does not have the drawbacks of the method of the prior art and provides a solution to the problems of the prior art.

Thus, the method according to the invention allows preparation of uranium peroxide or of uranium peroxide hydrate which has a low content of impurities, in particular a sufficiently low impurity content so that this uranium peroxide or this uranium peroxide hydrate may be directly converted into $UF_4$ and then into $UF_6$.

The method according to the invention notably allows preparation of $UO_4$ hydrate which totally or for a major part meets the ASTM C-787 standard relating to the purity of $UO_4$ hydrate for conversion into $UF_6$.

The method according to the invention further allows preparation of a uranium peroxide which has high reactivity for rapid conversion into $UF_4$.

Indeed, the method according to the invention gives the possibility of obtaining a $UO_4$ hydrate having a high specific surface area, which may range up to 30 m²/g.

The invention will now be described in a detailed way in the detailed description which follows notably in connection with preferred embodiments. This description is given as an illustration and not as a limitation, with reference to the appended drawings.

Figure 4:
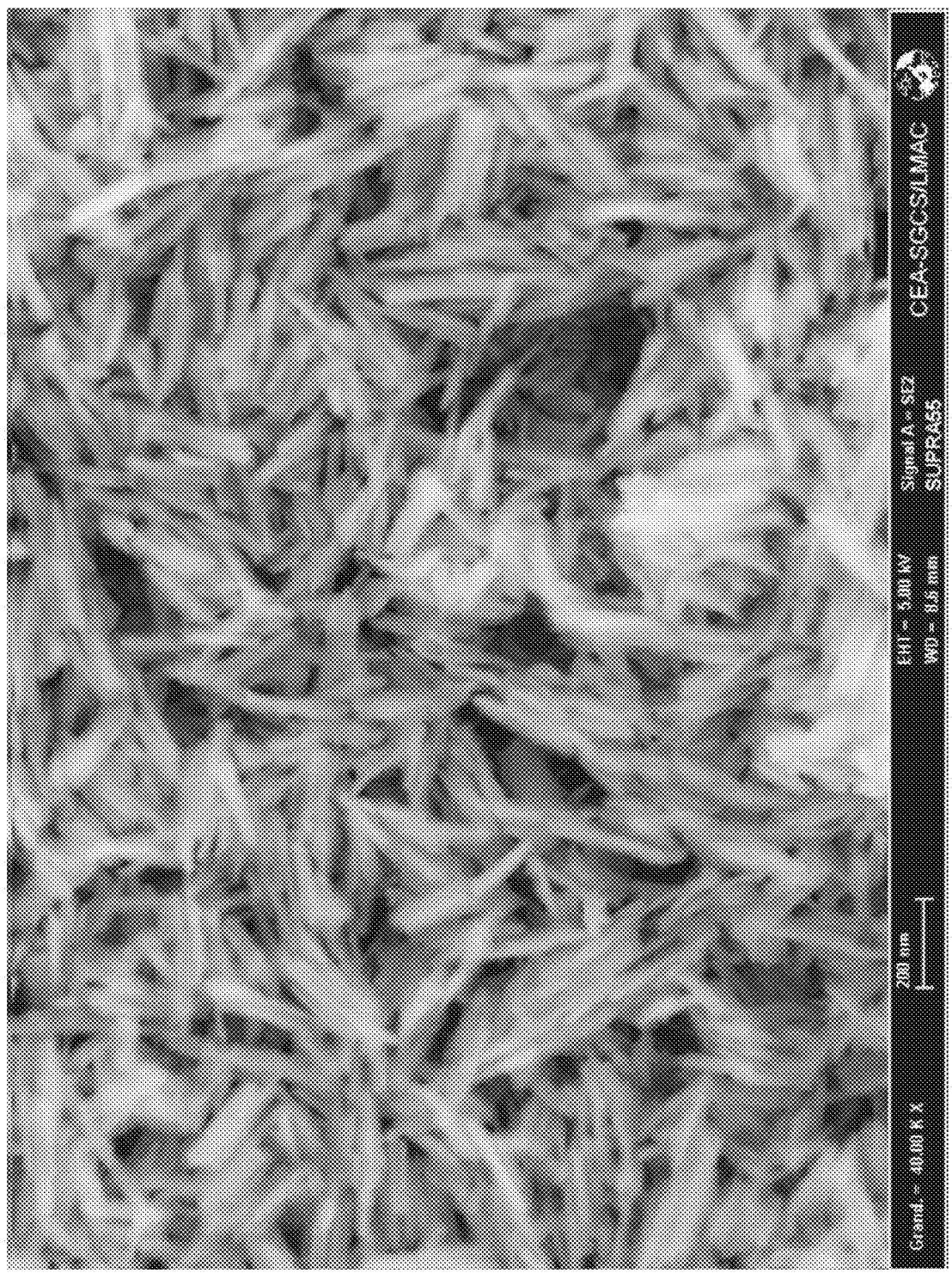
FIG. 4 is a photograph taken with a scanning electron microscope (SEM) of nanometric needles of $UO_4 \cdot 2H_2O$ with a size of 200 nm, as obtained in Example 1.

The scale indicated in FIG. 4 represents 200 nm.

Figure 5:
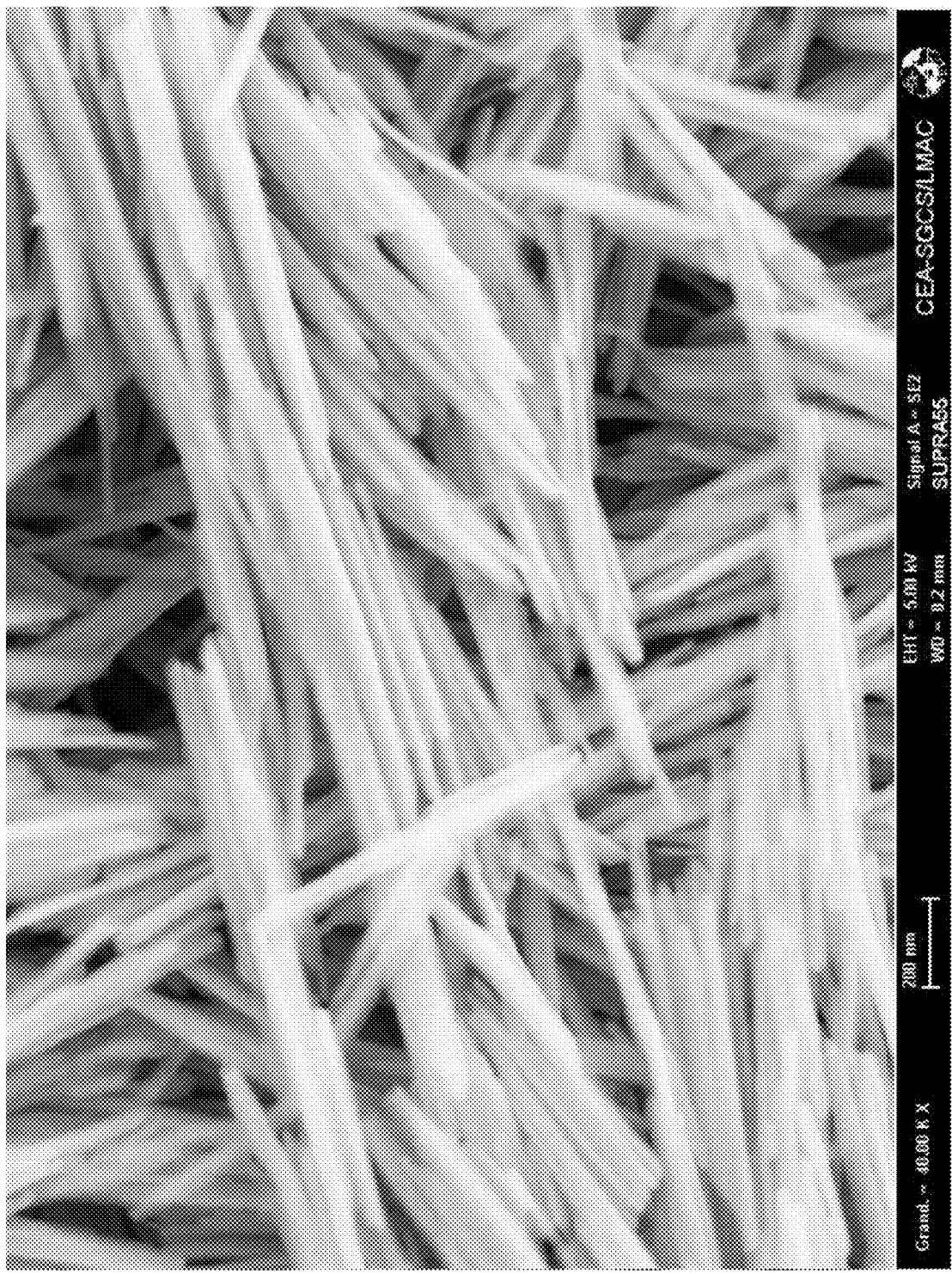

FIG. 5 is a photograph taken with a scanning electron microscope of needles of $UO_4 \cdot 2H_2O$ with a size from 1 μm to 2 μm, as obtained in Example 2.

The scale indicated in FIG. 5 represents 200 nm.

Figure 6:
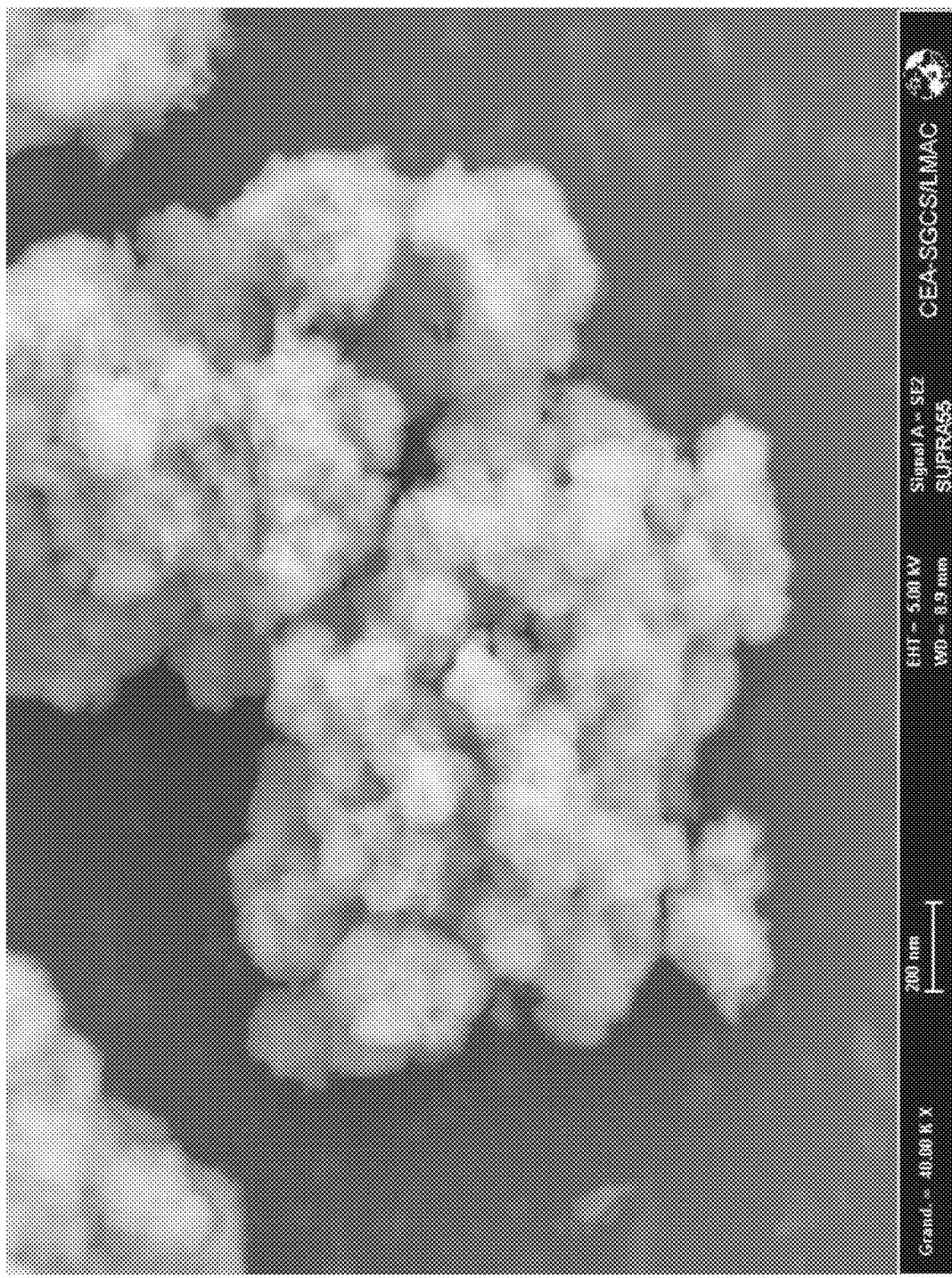

FIG. 6 is a photograph taken with a scanning electron microscope of agglomerates of $UO_4 \cdot 2H_2O$ with a size from 100 nm to 200 nm, as obtained in Example 6.

The scale indicated in FIG. 6 represents 200 nm.

DETAILED DESCRIPTION OF SPECIFIC EMBODIMENTS

In the first step of the method according to the invention, an aqueous suspension of a uranium trioxide $UO_3$ powder and/or of a uranium octa-oxide $U_3O_8$ powder is prepared.

The method according to the invention may be applied with all kinds of uranium trioxide $UO_3$ and/or uranium octa-oxide $U_3O_8$, regardless of their origin and of the shape in which they appear.

These oxides may for example appear as concentrates called « yellow cake ».

These oxides may also stem from drying, and then from calcination of a uranium concentrate based for example on $UO_4$ hydrate, ammonium diuranate, or uranium tricarbonate by precipitation in a reactor, notably in a fluidized bed reactor, from an uraniferous solution.

A method for preparing a $UO_3$ powder or a $U_3O_8$ powder by drying and then by calcination of a uranium concentrate based on hydrated $UO_4$, on ammonium diuranate or on uranium tricarbonate obtained beforehand by precipitation in a fluidized bed, is described in document WO-A1-2010/051855 to the description of which reference may be made.

The $UO_3$ or $U_3O_8$ powders obtained in this document because of the preparation of the uranium concentrate in a fluidized bed, have particularly advantageous properties.

The oxides in the form of concentrates called « yellow cake » or the oxides stemming from drying and calcination of a uranium concentrate obtained preferably by precipitation in a fluidized bed generally appear as powders and may be directly used in the method according to the invention, and be suspended in water.

However, it may be advantageous to carry out preliminary milling of the oxide powders in order to obtain a particularly fine grain size, for example of the order of one micrometer.

The suspended powders generally contain impurities and the method according to the invention notably has the purpose of reducing the content of these impurities in the obtained hydrated uranium peroxide (uranium peroxide hydrate).

Preferably, with the method according to the invention, it is sought to obtain an hydrated uranium peroxide for which the impurity contents are compatible with its transformation into $UF_6$ and for which the impurity contents meet the ASTM C-787 standard.

The $U_3O_8$ powder may contain one or more of the following impurities, for example in the following contents, expressed in ppm/U:

As: 102
Ca: 1383
Si: 2312
Zr: 316
$SO_4$: 29205
Mo: 1109
Na: 20

The $UO_3$ powder may contain one or more of the following impurities, for example in the following contents expressed in ppm/U:

Na: 404
Ca: 407
Mo: 9
V: 5
W: 2
Cr: 30

The reactor used for applying the method according to the invention and notably for carrying out steps a) and b) is generally a perfectly stirred reactor generally provided with a propeller stirrer, for example a three-bladed propeller.

The reactor may further be provided with counter-blades or baffles.

The volume of the reactor may be easily selected by the man skilled in the art according to the suspension volume which is desirably prepared.

The reactor may further be provided with sensors and devices for measuring the values of parameters such as the pH and the temperature of the suspension.

The suspension is generally prepared by introducing a known amount of powder of oxide(s) into the reactor.

The intended amount of demineralized water is then added to this known amount of oxide, in order to obtain a suspension having the desired concentration.

It is quite obvious that it is also possible to begin by introducing the demineralized water into the reactor, and then adding the oxide powder to the demineralized water.

The concentration of oxide(s) of the suspension is generally from 10 to 500 gU/L, preferably from 100 to 200 gU/L.

The pH of the demineralized water is adjusted to a value from 2 to 3 by adding an acid or a mixture of acids.

This(these) acid(s) may be any mineral or organic acid.

As this will be seen later on, an acid for which the anion further has a complexing action which improves kinetics of the reaction, is preferred.

The preferred acids are sulfuric acid, oxalic acid and mixtures thereof.

Other acids may moreover be used for adjusting the pH but sulfuric acid has the advantage of not introducing bothersome elements towards the nuclear purity of $UF_6$ since no ASTM specifications dealing with sulfur exist.

Moreover, the conversion rate into hydrated $UO_4$ is limited by the formation of a reaction intermediate (uranyl ion $UO_2^{2+}$) but may be accelerated by using at least one complexing anion like the sulfate anion or the oxalate anion or further the citrate anion, and/or, as this will be seen later on, by applying ultrasonic waves.

It is therefore possible to add a compound providing, this complexing anion during step a) and/or step b) of the method according to the invention. In the case of sulfur, the optimum ratio S/U is 0.125.

Sulfuric acid will preferably be used as a compound providing the complexing anion for suspending the uranium oxide in order to obtain fast conversion kinetics.

The powder and the demineralized water having been introduced into the reactor, stirring is started in order to suspend the powder(s) in the demineralized water.

The stirring speed is adjusted so as to allow effective suspension of the powder.

Stirring is continued during the whole duration of the conversion into hydrated $UO_4$ in order to complete crystallization of the initial uranium.

It is then possible to begin with adding oxygenated water into the suspension.

The addition of oxygenated water may be accomplished by means of any adequate device giving the possibility of controlling the flow rate of oxygenated water introduced into the reactor.

The addition of oxygenated water is also preferably achieved with stirring.

Hydrogen peroxide is generally added in the form of an aqueous solution at a concentration of 30% to 70% by weight.

The total amount of added oxygenated water is, according to the invention, such that the stoichiometric excess of $H_2O_2$ relative to the initial uranium is from more than 1 to 10, preferably from 1.5 to 3, relative to the stoichiometry of the following reaction (1), and from more than 1.33 to 10 relative to the stoichiometry of the following reaction (2):

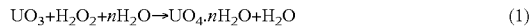  (1)

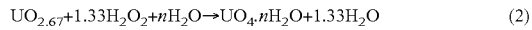  (2)

The reaction between the oxides and the oxygenated water is exothermic and an increase in the temperature of the bath for example by about 10° C. is observed.

In an embodiment, the following successive steps b1) and b2) are carried out:

b1) adding, as described above, hydrogen peroxide $H_2O_2$ to the aqueous suspension of a $UO_3$ and/or $U_3O_8$ powder, preferably with stirring, and then stopping the addition;

b2) ripening the suspension, preferably with stirring.

During step b1) it may be estimated that some conversion into hydrated uranium peroxide occurs, but this conversion is not total.

Step b1) may be described as a nucleation, crystallization, formation of uranium peroxide hydrate crystallites, step.

During step b2), the conversion is continued until the conversion of $UO_3$ and/or $U_3O_8$ into $UO_4$ hydrate is total or substantially total, for example of more than 90% or even 99.9%.

Step b2) may be described as a step for ripening, growing the crystallites obtained during step b1).

The duration of said step b1) may be from 1 to 8 hours, preferably from 1 to 3 hours, and the duration of the step b2) may be from 1 to 24 hours, preferably from 1 to 3 hours.

The total duration of steps b1) and b2) is such that the conversion into hydrated uranium peroxide is total or substantially total.

In another embodiment, the ripening step is not carried out at the end of step b1) and step b2) is omitted.

It should be noted that during the reaction of oxygenated water with the oxides, the pH varies but remains globally stable, constant, at the value to which it had been adjusted before adding the oxygenated water by adding an acid, which means that it is generally not necessary to add further acid during step b) in order to control the pH to the intended value.

In fact, it may be estimated that some regulation of the pH is induced by the addition of $H_2O_2$ to $UO_3$ and to $U_3O_8$.

At the end of the reaction, the conversion being total or substantially total, the pH is generally stabilized at a value for example from 1.6 to 2.

At the end of step b), the conversion into hydrated uranium peroxide being total or substantially total, the precipitate, the crystals of $UO_4$ hydrate, generally as $UO_4$ tetrahydrate, $UO_4.4H_2O$, or optionally as $UO_4$ dihydrate, $UO_4.2H_2O$, are recovered, notably in the case when the suspension was subject to the action of ultrasonic waves.

In a first alternative of this recovery step c) it is possible to recover, collect, the $UO_4$ hydrate precipitate, crystals, by removing the water from the suspension by evaporating the latter, and the $UO_4$ hydrate precipitate, crystals, are then recovered as a dry solid, generally with an humidity of less than 7% by mass, generally directly in the reactor without it being necessary to apply a liquid/solid separation operation such as a filtration. The recovered $UO_4$ hydrate crystals in this alternative are generally $UO_4.2H_2O$ crystals.

This first alternative is in particular applied, as described in detail below, in the case when the suspension is subject to the action of ultrasonic waves.

In a second alternative of this recovery step c), it is possible to recover, collect, the precipitate, the hydrated $UO_4$ crystals, by separating them from the suspension with a liquid-solid separation operation, in the form of a humid solid, for example with a humidity from 30% to 80% by mass, also called a cake.

The recovered $UO_4$ hydrate crystals in this second alternative are generally crystals of $UO_4.4H_2O$.

This liquid-solid separation operation may be an operation for filtering the suspension.

This filtration operation may be achieved in vacuo or by action of a centrifugal force.

The collected humid solid may then be washed with a washing liquid.

Said washing liquid may be demineralized water or an aqueous solution, acidified, preferably at a pH from 2 to 3, for example with sulfuric acid.

An aqueous solution preferably with a pH from 2 to 3, of a complexing anion towards the impurities contained in the humid solid such as those already mentioned above, may also be used as a washing liquid.

Sulfuric acid has the advantage of playing both an acidifying and complexing role by means of its sulfate anions.

The washing operation may be repeated from 1 to 10 times depending on the desired impurity content of the uranium peroxide.

Advantageously, the washing ratio defined by the ratio of the mass of the washing liquid (on the totality of the washings) to the mass of the humid solid is from 1 to 30, preferably from 1 to 10, in order to limit the volumes of water required for washing.

The suspension may further be subject to the action of ultrasonic waves.

The applied ultrasonic waves may have a single frequency, but a combination of ultrasonic waves with different frequencies may be used, for example a combination of high frequency ultrasonic waves, with a frequency for example of 2.4 MHz, and of low frequency ultrasonic waves with a frequency for example of 35 kHz.

For example, it is possible to place the reactor containing the suspension into an ultrasonic tank or else position one or several ultrasonic probes in the reactor.

Generally the suspension is subject to the action of ultrasonic waves while adding oxygenated water to the suspension. But it is also possible to apply ultrasonic waves during the step for preparing the solution.

The conversion is then much faster than in the case when the reaction is carried out without subjecting the suspension to the action of ultrasonic waves, and the duration of step b) is then only from 1 to 2 hours, instead of for example 24 hours, in order to obtain total or substantially total conversion.

The action of the ultrasonic waves should not be mistaken for mechanical stirring.

Generally, when ultrasonic waves are used, the suspension is not stirred in another way.

It should be noted that the action of ultrasonic waves causes an increase in the temperature of suspension, which causes overconsumption of $H_2O_2$.

When ultrasonic waves are used, it may therefore be necessary to cool the suspension in order to avoid degradation of the oxygenated water which generally occurs at a temperature above 50° C.

Because of the heating of the suspension caused by the ultrasonic waves, the water of the suspension may be removed by evaporation, and the precipitate (the hydrated $UO_4$ crystals) is then recovered directly in the reactor as a quasi-dry solid, for example with a humidity of less than 7% by mass and without any washing.

The use of ultrasonic waves therefore gives the possibility of significantly accelerating conversion kinetics and notably reduces the amount of water in the obtained hydrated uranium peroxide. Consequently, the hydrated uranium peroxide may be recovered without it being necessary to pass through a liquid-solid separation step, such as a step for filtering the suspension.

As this separation step is suppressed, the method is therefore simplified and shortened.

The method according to the invention may optionally comprise a step for drying the recovered $UO_4$ hydrate crystals.

This drying step is generally carried out at a temperature from 60° C. to 100° C. for a period of 1 to 24 hours.

During this step, the recovered hydrated uranium peroxide is transformed into $UO_4.2H_2O$ if this is $UO_4.4H_2O$.

The obtained hydrated uranium peroxide has high reactivity for fast conversion into $UF_4$.

For example, a conversion of at least 90% of the uranium into $UF_4$ is achieved in 800 seconds. Indeed, the method according to the invention gives the possibility of obtaining a hydrated $UO_4$ having a high specific surface area which may range up to 30 $m^2/g$.

It should be noted that the conversion rate has an influence on the morphology of the uranium peroxide hydrate obtained by the method according to the invention, which generally appears in the form of nanometric needles with a length from 300 to 500 nm and a diameter from 50 to 100 nm.

Indeed, the slower the conversion, and the longer and the finer are the needles and the more the uranium peroxide or the uranium peroxide hydrate have a high specific surface area.

The needles prepared by the method according to the invention have acicularity expressed by the length/diameter ratio, generally from 3 to 10.

The contents of impurities in the uranium peroxide obtained by the method according to the invention, notably because the method according to the invention does not comprise any preliminary dissolution step that may bring additional impurities, are very low.

In the following Table 1 are given the initial contents of impurities in the oxide and the final contents of impurities in the purified uranium peroxide obtained at the end of the method according to the invention.

TABLE 1

| Impurity | Initial content in the oxide (ppm/U) | Final content in the purified $UO_4$ hydrate(ppm/U) | Decontamination factor(initial content/final content) |
| --- | --- | --- | --- |
| Mo | 1394-1414 | 39-40 | 35.0 |
| W | 141-171 | 19-22 | 8.0 |
| S | 4669-4715 | 250-1400 | 3-18.8 |

The contents of impurities in the final peroxide are less than those of peroxides obtained with the methods of the prior art and for most of them are compliant with the ASTM C-787 standard.

EXAMPLES

The following examples describe the results obtained by applying the method according to the invention on several types of uraniferous concentrates for which the mining origin, the chemical composition and the calcination temperature are different.

These compounds will therefore be noted in the continuation of the text in the form of « concentrate 1 », « concentrate 2 » etc.

In the examples 1 to 5 which follow, focus is laid on the conversion of $U_3O_8$.

Example 1

Tests on the Concentrate 1

In this example, precipitation of uranium peroxide with 30% hydrogen peroxide is accomplished from Concentrate 1.

The targeted concentration in the reactor is 100 g/L.

The initial content of sulfates in the mined oxide is 24,824 ppm/U.

The reactor used for this precipitation is a perfectly stirred reactor « MSU 700 » with a useful volume of 700 mL provided with 4 counter-blades and a three-bladed propeller stirrer, the diameter of these blades being 50 mm.

The speed of rotation of the three-bladed propeller is adjusted to 600 rpm in order to allow efficient suspension of the uranium powder. Precipitation of the uranium is carried out at room temperature.

The characteristics of the tank of the reactor as well as of the stirring device are indicated in Table 2 below:

TABLE 2

| Tank | |
|---|---|
| Taps on the lid | 4 |
| Tank volume | 0.7 L |
| Tank inner diameter | 80 mm |
| Tank height | 135 mm |
| Counter-blades inside the tank | yes (4) |
| Volume of liquid in the tank (when operating) | 0.5 L |
| Stirring | |
| Stirring type | Rod with 3-fin propellers |
| Blade height | 15 mm |
| Blade diameter | 50 mm |
| Blade height relatively to the bottom of the tank | 0.05 mm |
| Blade diameter/tank diameter ratio | 0.6 |
| Speed of rotation of the three-bladed propeller | 600 rpm (turbulent flow) |

Various sensors and measurement devices notably for the pH and for the temperature give the possibility of tracking the precipitation reaction.

After adding a known amount of the milled oxide powder into the reactor, the uranium is suspended by stirring in demineralized water, the pH of which is adjusted to pH 3 with sulfuric acid.

The oxygenated water supply is then started by means of a metering syringe pump allowing control of the flow rate of reagent introduced into the reactor.

The reaction is exothermic as shown by a 10° C. increase in the temperature of the bath, and the pH is stabilized at 1.6 at the end of the reaction.

After having achieved introduction of oxygenated water into the reactor for a duration of 3 h 30 mins corresponding to a molar ratio $H_2O_2/U=3$, the oxygenated water supply is stopped and the obtained homogeneous suspension of yellow hydrated $UO_4$ is left with stirring for ripening during 3 h 30 mins.

After stopping the stirring, the uranium suspension is filtered on a Büchner (filter: Ø=142 mm; porosity=0.45 µm) and then washed with water acidified to pH 3 with sulfuric acid. The washing ratio or « wash ratio» is 1.6.

After filtering the uranium suspension, a humid cake is obtained. The humidity content of this cake is 63%.

Analysis of the chemical composition of the filtration mother liquors shows that the residual uranium content in the filtrate is very low, i.e. of the order of 1 mg/L.

The obtained cake is then dried in the oven at 90° C. for 24 hours and the dry residue is analyzed.

Analyses of the obtained solid were carried out by X-ray diffraction (XRD) (see FIG. 1) and by scanning electron microscopy (SEM) (see FIG. 4).

The XRD analyses (FIG. 1) show that the dry residue actually consists of $UO_4$ hydrate in the dihydrate form $UO_4.2H_2O$ (recognition of the characteristic peaks of the defined compound).

The SEM photographs (FIG. 4) show that $UO_4.2H_2O$ is in the form of nanometric needles with a length of 200 nm for example.

The impurity contents measured in the purified $UO_4$ hydrates are given in the following Table 3:

TABLE 3

| | Concentrate 1 (ppm/U) | Purified $UO_4$ hydrate (ppm/U) | Decontamination factor [ ]init/[ ]final |
|---|---|---|---|
| As | 87 | 10 | 8.7 |
| Ca | 1176 | 152 | 7.7 |
| Si | 1965 | 330 | 6.0 |
| Zr | 269 | 37 | 7.3 |
| $SO_4$ | 24824 | <7000 | >3.5 |

Considering the whole of these results, it may be considered that the conversion of the Concentrate 1 into $UO_4$ hydrate is total and that the precipitation yield is close to 100%.

The concentrations of impurities in the final product show that the method according to the invention has allowed significant purification of the initial concentrate.

In other words, the method according to the invention gave the possibility of removing the essential part of the chemical elements present as impurities in the initial concentrate.

Example 2

Tests on the Concentrate 2

In this example, precipitation of uranium peroxide is carried out under the same conditions as in Example 1 but on the Concentrate 2.

The same behavior of the reaction medium is observed as in Example 1, i.e.: exothermic reaction, stabilization of the pH towards 1.6 at the end of the reaction but the kinetics is much slower. The duration of the method until the stopping of the stirring which was 7 hours (3 h 30 mins+3 h 30 mins) in Example 1, is 24 hours in Example 2.

The humidity content of the $UO_4$ hydrate cake is higher than in Example 1. This humidity content is actually 78% instead of 63%. This difference is perhaps related to the size of the $UO_4$ hydrate needles which are much larger than in the case of the Concentrate 1 (see FIG. 5).

The uranium content of the filtrate is 9 mg/L.

Analyses of the obtained solid were carried out by X-ray diffraction (XRD) (see FIG. 2) and by scanning electron microscopy (SEM) (see FIG. 5).

Figure 1:
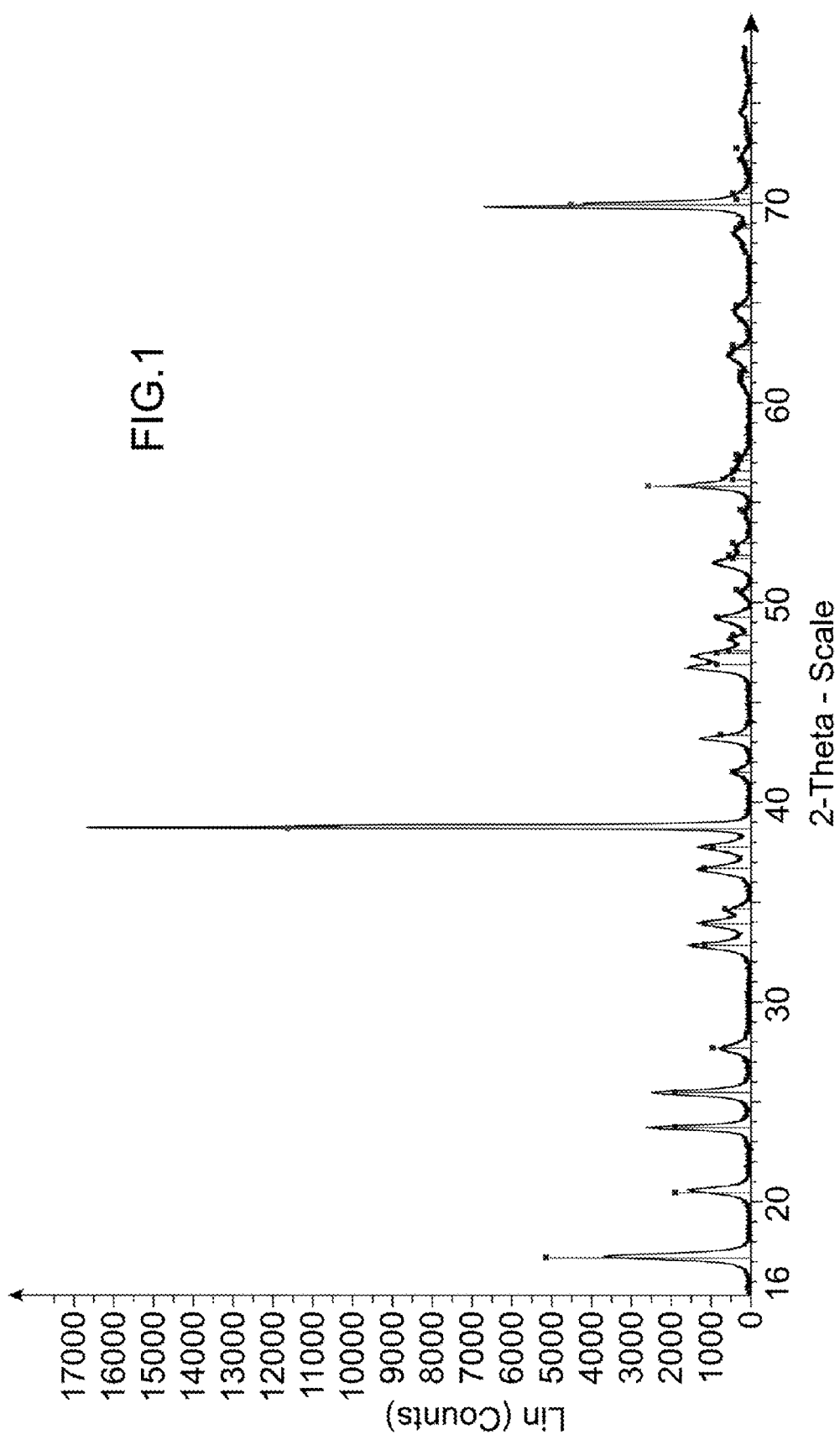
FIG. 1 illustrates the DRX spectrum of the purified uranium powder in the form of $UO_4 \cdot 2H_2O$ as obtained in Example 1.
Figure 2:
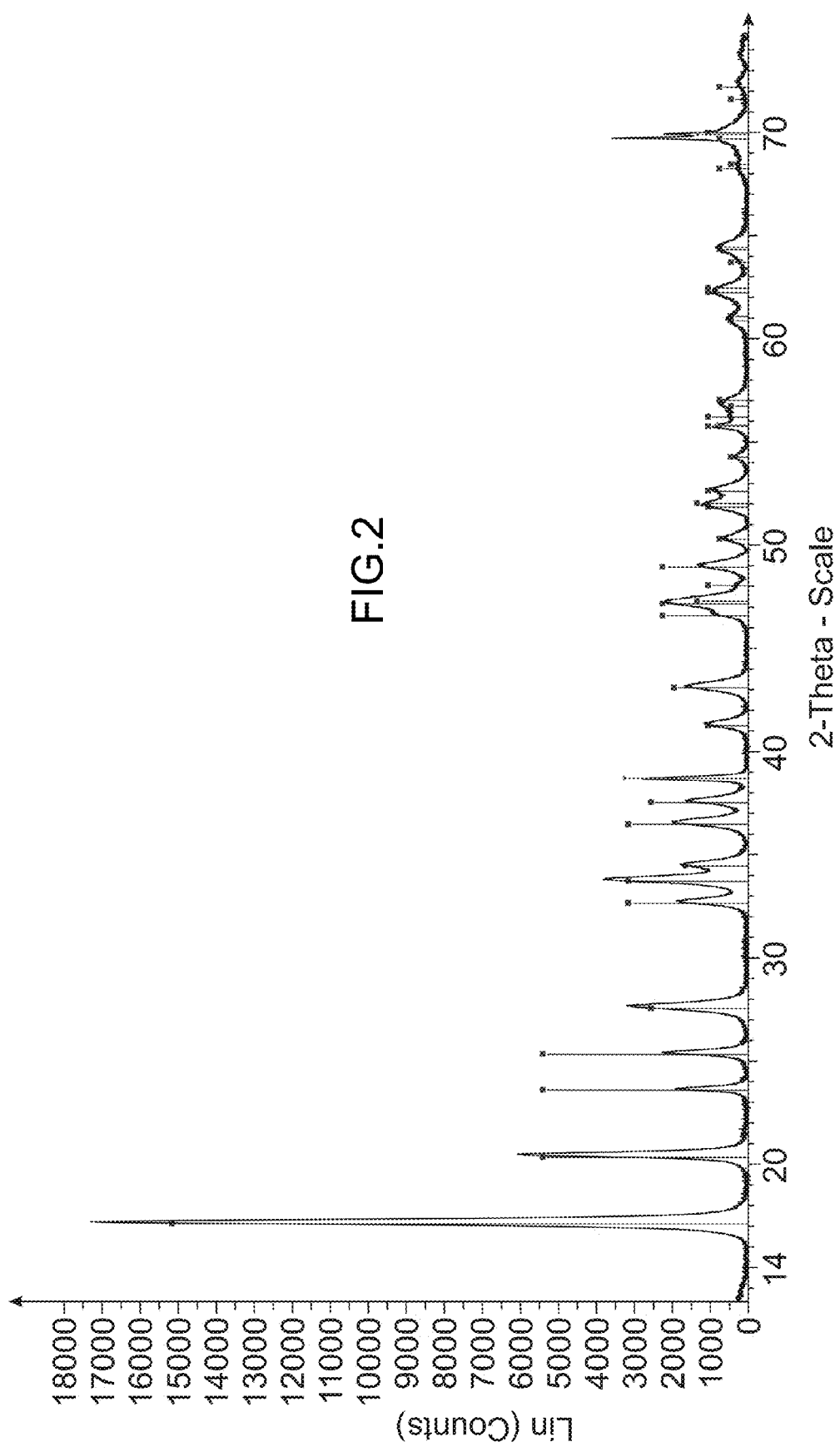
FIG. 2 illustrates the DRX spectrum of the purified uranium powder in the form of $UO_4 \cdot 2H_2O$ as obtained in Example 2.

In FIG. 5, 1 to 2 μm needles of $UO_4.2H_2O$ are observed.

The measured impurity contents in the purified $UO_4$ hydrate are given in the following Table 4:

TABLE 4

|  | $U_3O_8$ (ppm/U) | Purified $UO_4$ hydrate (ppm/U) | Decontaminating factor [ ]init/[ ]final |
|---|---|---|---|
| Mo | 943 | 103 | 9.2 |
| Na | 17 | 4 | 4.3 |

The molybdenum content is still high as compared with the ASTM specification and it does not seem possible to reduce it even in the case when complexing agents are used which promote local dissolution kinetics of the uranium (see Examples 3 and 4).

However, it is no doubt possible to improve the removal of contamination by Mo by intensive washings of the $UO_4$ hydrate cake.

Washing with a washing ratio « wash ratio» of 10 may give the possibility of attaining a Mo content close to 10 ppm/U, which might be acceptable in the case of a supplementary purification downstream from the method (absorption of the impurities in $UF_6$).

Considering the whole of these results, it may be considered that the conversion of the Concentrate 2 is as satisfactory as the one of the Concentrate 1 but it is slower and requires an intensive washing step for obtaining sufficient decontamination.

Example 3

Tests on the Concentrate 3 with the Addition of Sulfates

The conversion of the Concentrate 3 was tested according to the operating procedure of Example 1 but the experimental results show that in this case, conversion is not possible.

The operating procedure was therefore modified by adding sulfates to the concentrate in order to complex the uranium and allow its conversion into $UO_4$ hydrate.

The tested molar ratios are: S/U=[0.125-1].

These tests were conducted on smaller amounts of U, i.e. a few grams in a stirred beaker with small volumes of solution (10 mL).

The targeted concentration in the beaker is 250 gU/L.

30% oxygenated water is gradually added to the powder suspended beforehand in demineralized water, with a molar ratio $H_2O_2/U=2$.

The sulfates are added in the form of sulfuric acid, so that the molar ratio S/U is equal to 0.125 which is the optimum value of this ratio, which corresponds to a concentration of sulfates in solution of 13 g/L.

After 8 hours, the initial concentrate is completely converted into $UO_4$ hydrate.

The pH varies during the reaction but is globally stable and equal to 2.

The formed hydrated $UO_4$ is filtered on a filter paper by gravity but is not subsequently washed.

The uranium content in the filtrate is 28 mg/L.

The analysis of the purified uranium given in Table 5 below shows that certain impurities such as Mo or W are removed, decontaminated but on the other hand sulfur is not removed, purified.

TABLE 5

|  | $U_3O_8$ (ppm/U) | Purified $UO_4$ (ppm/U) | Decontamination factor [ ]init/[ ]final |
|---|---|---|---|
| Mo | 1017 | 82 | 12.4 |
| W | 56 | 26 | 2.2 |
| S | 761 | 722 | 1.05 |

The results are therefore satisfactory, in particular as regards the kinetics, which is closer to that observed in the case of Example 1.

But like in the case of Example 2, intensive washing seems to be necessary in order to perfect removal of contamination of the uranium by impurities.

Example 4

Tests on the Concentrate 4 with Addition of Oxalates

As in the case of the preceding example, tests were conducted by using oxalic acid for accelerating conversion of the Concentrate 4.

The tested molar ratios are $C_2O_4/U$=[0.05-1].

The targeted concentration in the beaker is 50 gU/L.

The 30% oxygenated water is gradually added to the powder suspended beforehand in demineralized water, with a molar ratio $H_2O_2/U=2$.

Oxalic acid is added to the medium so that the molar ratio $C_2O_4/U$ is equal to 0.025, which corresponds to a concentration of oxalates in solution of 2.6 g/L.

After 11 hours, the initial $U_3O_8$ is completely converted to hydrated $UO_4$.

The pH does not fall below 2.

The hydrated $UO_4$ formed is filtered on a paper filter by gravity but is not washed subsequently.

The uranium content in the filtrate is very high, i.e. 520 mg/L, and may be explained by the highly complexing nature of the oxalate ions.

Additional tests were therefore conducted with an oxalate/sulfate mixture in order to attempt to reduce the uranium release, since the sulfates are less complexing than oxalates.

In the case of a ⅓ oxalic acid-⅔ sulfuric acid mixture, the conversion rate is 95% after 8 hours 30 mins.

The releases are reduced to 330 mg/L and therefore remain approximately ten times higher as compared with tests conducted without addition of oxalic acid.

Figure 3:
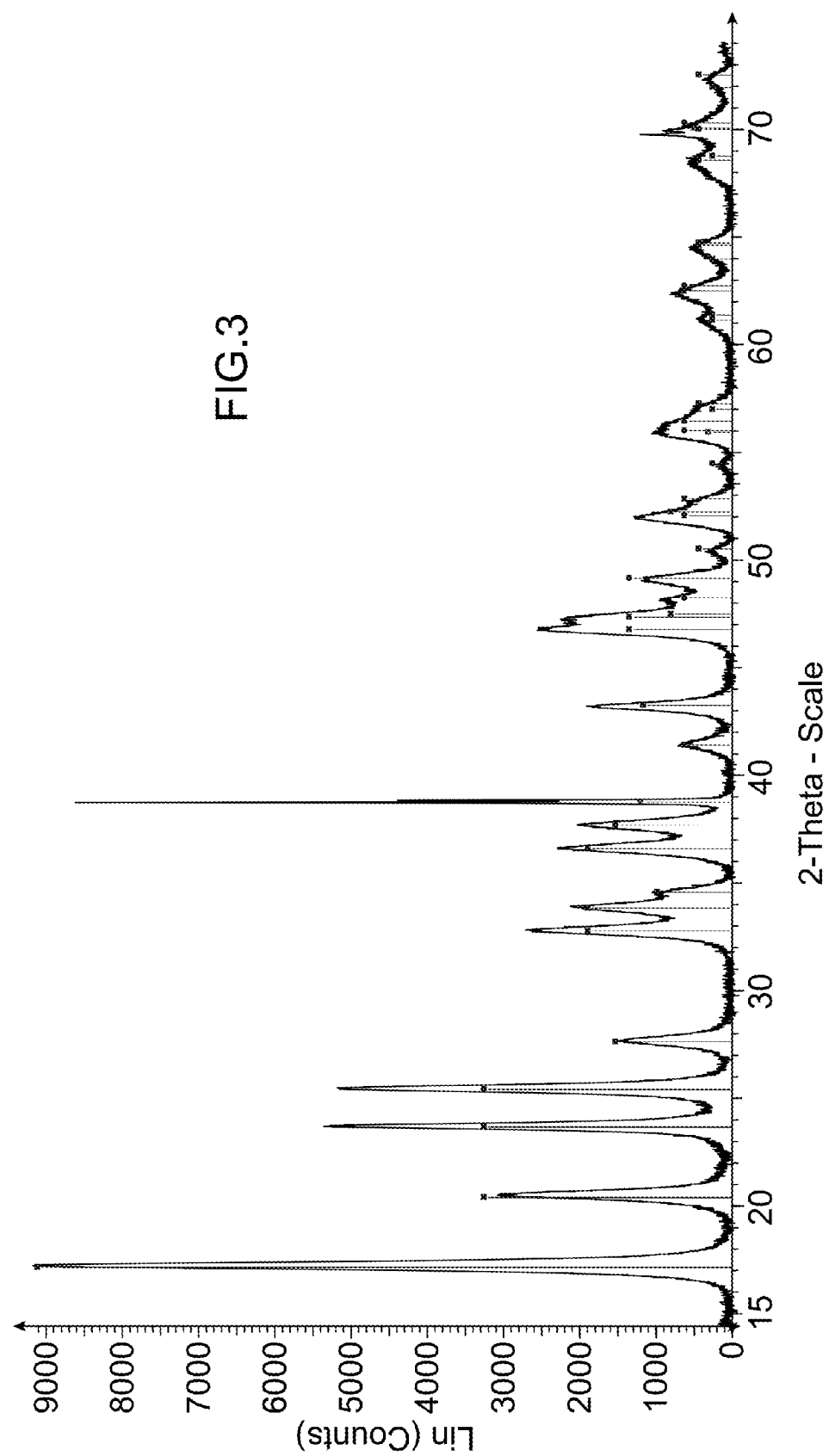
FIG. 3 illustrates the DRX spectrum of the purified uranium powder in the form of $UO_4 \cdot 2H_2O$ as obtained in Example 4.

The analysis of the purified uranium (see XRD spectrum: FIG. 3) when a ⅓ oxalic acid-⅔ sulfuric acid mixture is used, is given in Table 6 below:

TABLE 6

| ⅓ oxalic acid-⅔ sulfuric acid mixture | $U_3O_8$ (ppm/U) | Purified $UO_4$ hydrate (ppm/U) | Decontamination factor [ ]init/[ ]final |
|---|---|---|---|
| Mo | 1011 | 132 | 7.7 |
| W | 18 | 6 | 3 |
| S | 406 | 562 | — |
| V | 42 | 44 | — |
| Zr | 1019 | 953 | 1.1 |

The decontamination factors observed for W and Mo are comparable with those observed in the tests conducted with sulfuric acid alone.

Moreover, this treatment does not give the possibility of decontaminating, removing the following elements: S, V, Zr.

The operating procedure applied in this example, therefore seems to be less adapted than the one used in Example 3 in the case of highly impure oxides.

Example 5

Tests on the Concentrate 2 with Ultrasonic Waves

Tests were carried out by placing the beaker in an ultrasonic bath (35 kHz) in order to accelerate conversion of the Concentrate 2 according to the operating procedure of Example 3.

The conversion into $UO_4$ hydrate is carried out much more rapidly than in Example 2, i.e. within 2 hours instead of 24 hours, but the observed increase in temperature induces an overconsumption of $H_2O_2$, which excludes any optimization of this molar ratio ($H_2O_2/U$) with the penalty of reducing the conversion rate.

Moreover, it is seen that the final product is practically dry (no filtrate).

By using ultrasonic waves, it is therefore possible to significantly accelerate the conversion kinetics and to reduce notably the amounts of water in the purified $UO_4$ hydrate, which may have an advantage by simplifying the method, with potential suppression of a filtration step.

This operating procedure may be optimized (preliminary milling, injection of an inert gas, high/low frequencies ultrasonic waves combinations, control of the temperature by cooling the reaction medium, increase in the L/S ratio).

In the following Example 6, focus is laid on the conversion of $UO_3$.

Example 6

Tests on the Concentrate 5

Uranium peroxide precipitation tests were conducted under the same conditions as in Example 1 but with the Concentrate 5 by adding additional calcination and washing steps according to the following scheme:

Scheme 1

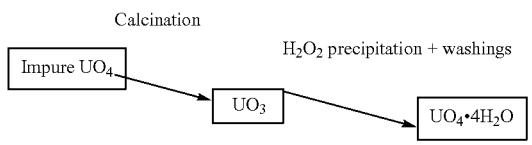

The step for calcination of impure $UO_4$ hydrate into $UO_3$ at 200° C. for 3 hours allows modification of the structure of the uranium in order to be able to then purify it more easily from its impurities during the subsequent steps.

The temperature of the calcination is a sensitive parameter.

Indeed, a test conducted at a temperature of less than 200° C. (150° C.) demonstrated degradation of the results obtained by the method according to the invention as regards the purification level of the uranium towards certain impurities such as sodium (imperfect calcination of impure $UO_4$ hydrate into $UO_3$, residual fraction of impure $UO_4$ hydrate which is more difficult to decontaminate as regards sodium removal).

The second step consists of recrystallizing $UO_3$ into $UO_4$ hydrate according to the initial operating procedure of Example 1 and then of washing the obtained cake with higher washing ratios (« Wash Ratios» or « WR» ) than previously.

Thus, a maximum wash ratio WR of 25 was applied but an optimum wash ratio may be located between 1 and 10.

The washing is carried out with demineralized water for which the pH is adjusted to 2.5 with sulfuric acid.

The selection of the acidity of the pH is guided by the efficiency of the purification in the washing step.

Indeed, a decrease in the purification level of the uranium with regard to sodium is observed if the washing is carried out with distilled water without any sulfuric acid.

This is explained by the complexing nature of the sulfates towards impurities such as sodium.

The washings are carried out with the method of successive "repulping" operations, with a repulping duration of 600 seconds, and the $UO_4$ hydrate suspensions are filtered between two repulping operations on a Büchner (filter: Ø=142 mm; porosity=0.45 μm).

With this method, the precipitation kinetics are fast, i.e. less than 5 hours (an estimation of the minimum conversion time is located around 1 hour), and the analyses of the obtained solid show that the conversion is actually total.

The reaction is exothermic and the pH increases at the beginning of the reaction and then returns to its initial value, which confirms the assumptions of precipitation of hydrated $UO_4$ catalyzed by the acid according to the following reaction scheme:

| | |
|---|---|
| Formation of the uranyl ion (Reaction intermediate): | $UO_3 + 2H^+ \rightarrow UO_2^{2+} + H_2O$ |
| Precipitation of the $UO_4$ hydrate: | $UO_2^{2+} + nH_2O + H_2O_2 \rightarrow UO_4 \cdot nH_2O + 2H^+$ |
| Equation balance: | $UO_3 + nH_2O + H_2O_2 \rightarrow UO_4 \cdot nH_2O + H_2O$ |

The targeted concentration in the reactor was 100 gU/L in this example, but other tests have shown that the optimum concentration should be found in the interval 100-200 gU/L.

Actually, a regression of the purification level of sodium is observed if the targeted [U] is greater than 200 gU/L.

This regression is the effect of the decrease in the specific surface area of the $UO_4$ hydrate with the concentration.

The oxygenated water excess used in this example is the same as in Example 1 but the optimum molar ratio $H_2O_2/U$ is located between 1 and 3.

The humidity level of the hydrated $UO_4$ cake is 46%.

The morphology and the size of the hydrated $UO_4$ grains are different from the others hydrated $UO_4$ produced in the previous examples: the powder consists of small nanometric agglomerates, for example from 100 nm to 200 nm (see FIG. 6).

The uranium content in the filtrate is 5.5 mg/L.

As shown in the following Table 7, the purity of the obtained $UO_4$ hydrate is highly satisfactory with respect to

TABLE 7

|    | Impure hydrated $UO_4$ (ppm/U) | Purified hydrated $UO_4$ (ppm/U) | ASTM standard | CX method limit |
|----|-------|------|------|------|
| Na | 404   | 4    |      | 40   |
| Ca | 407   | 58   |      |      |
| Mo | 9     | 1    | 1.4  |      |
| V  | 5     | 4    | 1.4  |      |
| W  | 2     | 1    | 1.4  |      |
| Cr | 30    | 3.9  | 10   |      |

The invention claimed is:

1. A method for converting $UO_3$ and/or $U_3O_8$ into hydrated $UO_4$ of formula $UO_4.nH_2O$ wherein n is 2 or 4, comprising the following successive steps:
   a) preparing an aqueous suspension of a $UO_3$ powder and/or a $U_3O_8$ powder;
   b) adding hydrogen peroxide $H_2O_2$ to the aqueous suspension of a $UO_3$ and/or $U_3O_8$ powder, converting the $UO_3$ and/or $U_3O_8$ into hydrated $UO_4$ and precipitating the hydrated $UO_4$ in the suspension;
   c) recovering the precipitate of $UO_4$ hydrate;
   d) optionally, washing the recovered $UO_4$ hydrate precipitate;
   e) optionally, repeating step d);
   f) optionally, drying the precipitate;
wherein the addition of $H_2O_2$ to the aqueous suspension is carried out so that the suspension contains a stoichiometric excess of $H_2O_2$ relative to the stoichiometry of the reaction from $UO_3$:

$$UO_3 + nH_2O + H_2O_2 \rightarrow UO_4.nH_2O + H_2O \quad (1)$$

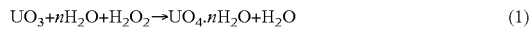

or of the reaction from $U_3O_8$ $$UO_{2.67} + 1.33H_2O_2 + nH_2O \rightarrow UO_4.nH_2O + 1.33H_2O \quad (2),$$

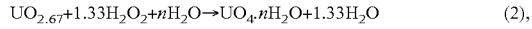

and the pH of the suspension is maintained in steps a) and b) at a value comprised between 2 and 3.

2. The method according to claim 1, wherein the pH of the suspension is adjusted during step a) to a value comprised between 2 and 3 by adding an acid to the suspension.

3. The method according to claim 2, wherein the acid is selected from the group consisting of oxalic acid, sulfuric acid and mixtures thereof.

4. The method according to claim 1, wherein the stoichiometric excess of $H_2O_2$ is from more than 1 to 10, relative to the stoichiometry of the reaction (1) and from more than 1.33 to 10 relative to the stoichiometry of reaction (2).

5. The method according to claim 1, wherein the hydrogen peroxide is added as an aqueous solution at a concentration of 30% to 70% by weight.

6. The method according to claim 1, wherein the aqueous suspension of $UO_3$ and/or $U_3O_8$ has a uranium concentration from 10 to 500 g/L expressed as gU/L.

7. The method according to claim 1, wherein steps a) and b) are carried out with stirring.

8. The method according to claim 1, wherein during step a) and/or step b) complexing anions are added to the suspension.

9. The method according to claim 8, wherein the complexing anions are selected from the group consisting of sulfate anions, oxalate anions and mixtures thereof.

10. The method according to claim 1, wherein the duration of step b) is selected so that the conversion of $UO_3$ and/or $U_3O_8$ into $UO_4$ hydrate is total or substantially total.

11. The method according to claim 1, wherein step b) comprises the following successive steps b1) and b2):
   b1) adding hydrogen peroxide $H_2O_2$ to the aqueous suspension of a $UO_3$ and/or $U_3O_8$ powder and then stopping the addition; and
   b2) ripening the suspension.

12. The method according to claim 11, wherein the duration of step b1) is from 1 to 8 hours and the duration of step b2) is from 1 to 24 hours.

13. The method according to claim 1, wherein the addition of hydrogen peroxide $H_2O_2$ is carried out during the whole duration of step b).

14. The method according to claim 13, wherein the duration of step b) is from 1 to 8 hours.

15. The method according to claim 1, wherein during steps a) and/or b) the suspension is subjected to the action of ultrasonic waves.

16. The method according to claim 1, wherein the water of the suspension is removed by evaporation and the precipitate of $UO_4$ hydrate, is recovered as a dry solid, with a humidity of less than 7% by mass, generally consisting of $UO_4.2H_2O$.

17. The method according to claim 1, wherein during step c), the precipitate of $UO_4$ hydrate is separated from the suspension by a solid/liquid separation operation, as a humid solid, with a humidity from 30 to 80% by mass, generally consisting of $UO_4.4H_2O$.

18. The method according to claim 17, wherein the humid solid is washed at least once with a washing liquid.

19. The method according to claim 18, wherein the washing liquid is selected from the group consisting of demineralized water; acidified aqueous solutions at a pH from 2 to 3; and solutions containing an agent complexing the impurities contained in the humid solid.

20. The method according to claim 19, wherein the washing ratio defined by the ratio of the mass of the washing liquid to the mass of the humid solid is from 1 to 30.

21. The method according to claim 1, wherein the $UO_3$ and/or the $U_3O_8$ appear in the form of a uraniferous concentrate called "yellow cake" or the $UO_3$ and/or the $U_3O_8$ stem from drying, and then from calcination of a uranium concentrate based on hydrated $UO_4$, on ammonium diuranate, or on uranium tricarbonate obtained by precipitation in a reactor, from an uraniferous solution.

* * * * *